US012424967B2

(12) United States Patent
Powers, III

(10) Patent No.: US 12,424,967 B2
(45) Date of Patent: Sep. 23, 2025

(54) FLAT ROOF SOLAR SENSOR STRUCTURES AND BOLT ATTACHMENT

(71) Applicant: John Powers, III, Phoenix, AZ (US)

(72) Inventor: John Powers, III, Phoenix, AZ (US)

(*) Notice: Subject to any disclaimer, the term of this patent is extended or adjusted under 35 U.S.C. 154(b) by 736 days.

(21) Appl. No.: 17/217,785

(22) Filed: Mar. 30, 2021

(65) Prior Publication Data

US 2022/0321054 A1 Oct. 6, 2022

(51) Int. Cl.
| | |
|---|---|
| *H02S 20/23* | (2014.01) |
| *F16B 25/10* | (2006.01) |
| *F16B 39/12* | (2006.01) |
| *H02S 30/10* | (2014.01) |
| *F24S 20/00* | (2018.01) |

(52) U.S. Cl.
CPC ............ *H02S 20/23* (2014.12); *F16B 25/103* (2013.01); *F16B 39/12* (2013.01); *H02S 30/10* (2014.12); *F24S 2020/13* (2018.05)

(58) Field of Classification Search
CPC ........ H02S 20/23; H02S 30/10; F16B 25/103; F16B 39/12; F16B 5/02; F16B 39/282; F24S 2020/13
See application file for complete search history.

(56) References Cited

U.S. PATENT DOCUMENTS

| | | | | |
|---|---|---|---|---|
| 4,812,095 A * | 3/1989 | Piacenti | ................. | F16B 39/282 411/959 |
| 9,523,517 B2 * | 12/2016 | Warpup | ................... | F24S 25/12 |
| 10,211,775 B1 * | 2/2019 | Wentworth | ............. | F24S 25/70 |
| 2010/0183400 A1 * | 7/2010 | Chen | .................... | F16B 25/0021 411/394 |
| 2011/0170983 A1 * | 7/2011 | Day | ......................... | F16B 39/24 472/137 |
| 2012/0180406 A1 * | 7/2012 | Kobayashi | .............. | F24S 25/35 52/173.3 |
| 2012/0266560 A1 * | 10/2012 | Panasik | ................. | F16B 35/065 411/387.4 |
| 2013/0146554 A1 * | 6/2013 | Berry | ...................... | F24S 25/12 211/175 |
| 2014/0047700 A1 * | 2/2014 | Lohr | ....................... | F16B 39/24 29/525.12 |

(Continued)

FOREIGN PATENT DOCUMENTS

| | | | |
|---|---|---|---|
| JP | 2020041384 A | * 3/2020 | |
| WO | WO-2011143733 A1 | * 11/2011 | .......... F16B 25/0015 |

*Primary Examiner* — Phi D Tran
(74) *Attorney, Agent, or Firm* — Parsons & Goltry; Robert A. Parsons; Michael W. Goltry

(57) ABSTRACT

A solar panel attachment assembly including a purlin bent into a U-shaped channel with a mounting wall, an upright wall and a cross piece attached to the upper edge. A solar panel having a frame with a lower horizontal wall forming a mounting surface and a vertical wall forming an outer surface. An inwardly directed channel formed on the upper edge of the vertical wall surrounds and fixedly engages the edges of solar sensors. Attachment bolts with a portion of the body being threaded and a tip portion of the body having a drill bit formed therein. The drill bit has an outer diameter smaller than an outer diameter of the bolt threads, and the attachment bolts are positioned to extend through the cross piece of the purlin and through the lower horizontal wall of the cross-section to hold the solar panel in abutting engagement with the purlin.

4 Claims, 5 Drawing Sheets

(56) References Cited

U.S. PATENT DOCUMENTS

| | | | |
|---|---|---|---|
| 2015/0000725 A1* | 1/2015 | Reilly | F24S 25/70 |
| | | | 136/251 |
| 2015/0107168 A1* | 4/2015 | Kobayashi | H02S 20/23 |
| | | | 52/173.3 |
| 2015/0292542 A1* | 10/2015 | Tapata | F16B 35/04 |
| | | | 411/337 |
| 2020/0182280 A1* | 6/2020 | Gong | F16B 25/0026 |
| 2022/0166370 A1* | 5/2022 | Brandt | F24S 25/61 |

* cited by examiner

FLAT ROOF SOLAR SENSOR STRUCTURES AND BOLT ATTACHMENT

FIELD OF THE INVENTION

This invention generally relates to solar panels or flat roof sections and to improved purlins and bolt attachments for fixedly attaching the solar panels to a flat roof structure.

BACKGROUND OF THE INVENTION

At the present time, metal flat roof structures and/or solar panel mounts include purlins in a generally C-shape or, in some instances, a box-shape for extra strength. The solar panels are then mounted on the purlins by means of bolts, screws, or other fastening devices. The purlins have an upper flat surface to which the solar panels are attached. The problem that arises is that the process of attaching the solar panels to the upper flat surface of the purlins is exceptionally difficult and time consuming.

For example, the solar panels or other roof sections must be placed on the upper flat surface of the purlins which can be a difficult task for larger roof areas, and then attached to the purlins by some attachment devices. The attachment devices can, primarily, be only inserted through the purlins and into the roof sections from the bottom or beneath the roof. This can be a daunting task since the roof sections are loose and held in place only by their weight. Thus, during the step of fixing the roof sections to the purlins the roof sections can become misaligned or incompletely attached. That is some bolts, screws, or other attachment devices can be inadvertently inserted through the solar panel proper or roof section proper rather than through supporting structures surrounding the solar panels or roof sections. Also, even if the assembly is error free, the task is very work intensive with the time and effort increasing as the errors are eliminated or attempted to be eliminated.

These problems were at least partially solved by using a solar clamp disclosed in a copending U.S. patent application entitled "Flat Roof Solar Sensor Structures and Clamp", application Ser. No. 14/623,043, filed 16 Feb. 2015, issued as U.S. Pat. No. 10,396,706 on Aug. 27, 2019 and incorporated herein by reference. In this invention U-shaped clamps were formed from sheet metal and used to hold solar panels rigidly against specially formed purlins. However, the solar clamps and specially formed purlins required additional work in the factory and some additional material.

It would be highly advantageous, therefore, to remedy the foregoing and other deficiencies inherent in the prior art.

Accordingly, it is an object of the present invention to provide a new and improved bolt that is simple to manufacture and easy to use in the field.

It is another object of the present invention to provide new and improved purlins and attachment bolts for attaching solar panels to a flat roof structure.

It is another object of the present invention to provide new and improved purlins that require less material and are easier to form and install.

It is another object of the present invention to provide a new and improved bolt that greatly simplifies assembly of solar panels to purlins.

SUMMARY OF THE INVENTION

Briefly, to achieve the desired objects of the instant invention in accordance with a preferred embodiment thereof, an attachment bolt for attaching a solar cell panel to a purlin on a roof is disclosed. The bolt includes a head including structure for attaching a driving tool to the head and an elongated body integrally attached to the head and extending perpendicularly outwardly from the head to an end, a portion of the body extending from the head to a midpoint threaded with bolt threads and a portion of the body extending from the midpoint to the end formed into a drill bit, the drill bit having an outer diameter smaller than the outer diameter of the bolt threads.

The desired objects of the instant invention are further realized in accordance with a solar panel attachment assembly including an elongated purlin including a strip of sheet metal longitudinally bent into an elongated sideways oriented U-shaped channel with an upright wall, a mounting wall integrally attached to the lower edge, and a horizontal cross piece integrally attached to the upper edge of the upright wall. The purlin includes one or more vertically upwardly extending solar panel positioning elements formed in the cross piece approximately midway between the edges and separating the cross piece into two parallel horizontal support surfaces. The upright wall, the mounting wall, and the cross piece extending longitudinally the entire length of the purlin. A solar panel having a generally rectangular shape and including a rectangular metal frame with a generally L-shaped cross-section, a lower horizontal wall of the L-shaped cross-section forming a mounting surface and a vertical wall forming an outer surface of the solar panel, an inwardly directed channel formed on the upper edge of the vertical wall to surround and fixedly engage outer edges of solar sensors. A plurality of attachment bolts, each bolt including a head including structure for attaching a driving tool to the head and an elongated body integrally attached to the head and extending perpendicularly outwardly from the head to an end, a portion of the body extending from the head to a midpoint threaded with bolt threads and a portion of the body extending from the midpoint to the end formed into a drill bit, the drill bit having an outer diameter smaller than the outer diameter of the bolt threads. The plurality of attachment bolts are positioned to extend through the cross piece of the purlin and through a hole in the lower horizontal wall of the L-shaped cross-section formed by the drill bit. A plurality of internally threaded lock washer/nuts positioned in engagement, one each, with the attachment bolts on the upper surface of lower horizontal wall of the solar panel to hold the solar panel in tight abutting engagement with the purlin.

The desired objects of the instant invention are further realized in accordance with a method of affixing solar panels to flat roof structures including the steps of providing an elongated purlin including a strip of sheet metal longitudinally bent into an elongated sideways oriented U-shaped channel with an upright wall, a mounting wall integrally attached to the lower edge, and a horizontal cross piece integrally attached to the upper edge of the upright wall. The horizontal cross piece includes one or more vertically upwardly extending solar panel positioning elements formed in the cross piece approximately midway between the edges and separating the cross piece into two parallel horizontal support surfaces. The upright wall, the mounting wall, and the cross piece extending longitudinally the entire length of the purlin. A plurality of spaced apart holes defined through the horizontal cross piece. A solar panel having a generally rectangular shape and including a metal frame with a generally L-shaped cross-section, a lower horizontal wall of the L-shaped cross-section forming a mounting surface and a vertical wall forming an outer surface of the solar panel. An inwardly directed channel is formed on the upper edge of the vertical wall to surround and fixedly engage the outer edges of solar sensors. The method further includes a step of providing a plurality of attachment bolts, each bolt including a head including structure for attaching a driving tool to the head and a body, a portion of the body from the head to a midpoint being threaded with bolt threads and a portion of the body from the midpoint to the end having a drill bit formed therein. The drill bit has an outer diameter smaller than an outer diameter of the bolt threads. Also provided are a plurality of internally threaded lock washer/nuts. The method further includes the steps of positioning the lower horizontal wall of the L-shaped cross-section of the solar panel on one of the two parallel horizontal support surfaces of the purlin with the vertical wall of the L-shaped cross-section of the solar panel butting against the positioning element of the purlin, attaching a driving tool to the structure for attaching a driving tool to the head of one of the plurality of attachment bolts, positioning the end of the one of the attachment bolts in one of the plurality of spaced apart holes defined through the horizontal cross piece, activating the driving tool to drive the drill bit of the one of the attachment bolts through the lower horizontal wall of the L-shaped cross-section of the solar panel, positioning one of the plurality of internally threaded lock washer/nuts over the drill bit on the upper surface of the lower horizontal wall of the L-shaped cross-section of the solar panel, and activating the driving tool to tightly thread the one of the attachment bolts with the one of the plurality of internally threaded lock washer/nuts.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
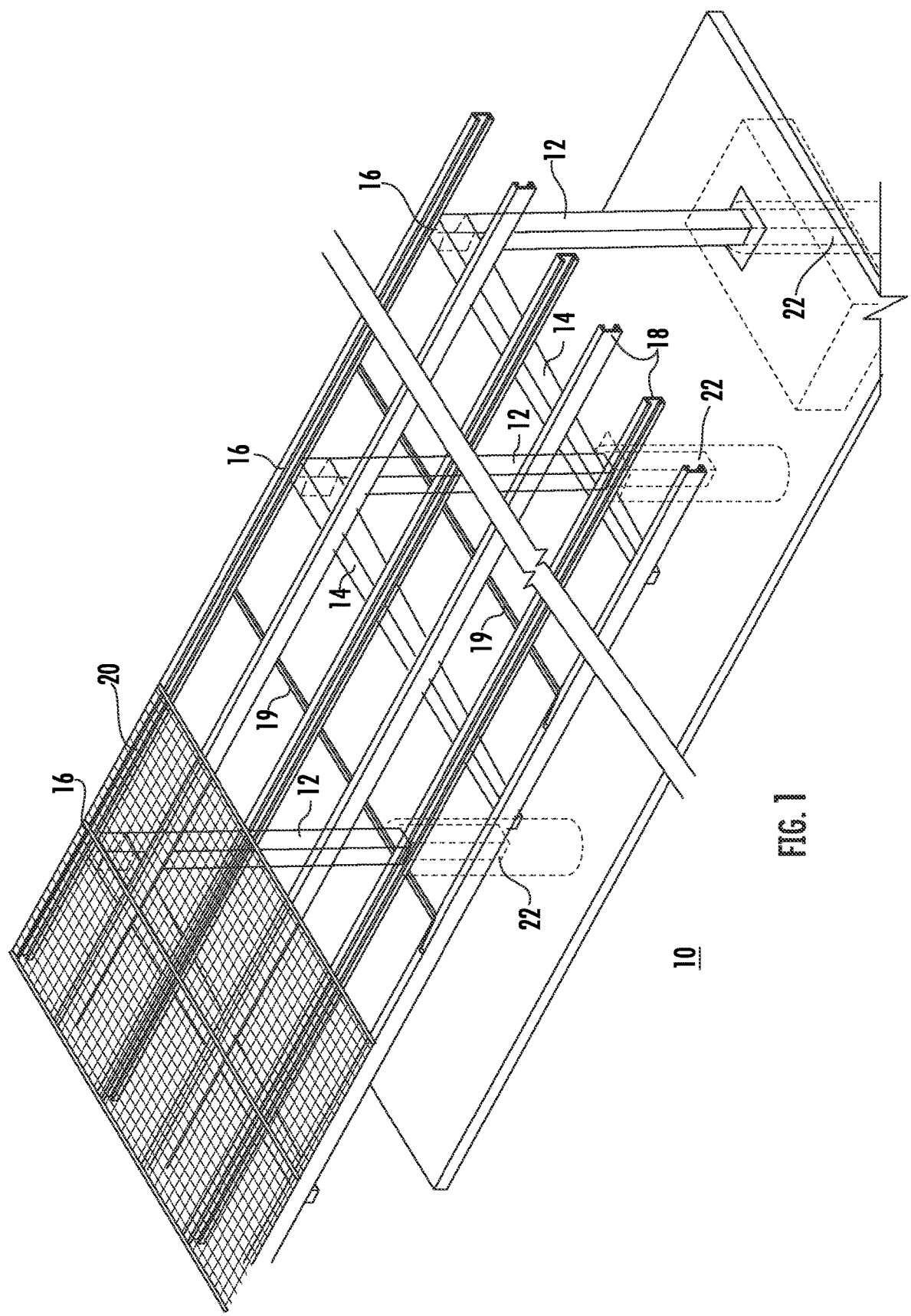
FIG. 1 is an isometric top view of a flat, cantilevered multi-column structure, typically used with the present invention.

Turning now to FIG. 1, a flat, cantilevered multi-column structure 10, typically used in conjunction with the present invention, is illustrated. Structure 10 includes a plurality of vertical columns or posts 12 each with a cantilever beam 14 attached to an upper end 16. A plurality of purlins 18 are affixed to an upper surface of beams 14 and positioned to extend longitudinally in parallel spaced apart relationship to substantially define the roof area. Additional purlin braces 19 can be incorporated between cantilever beams 14 for additional support if desired or deemed necessary. Some roofing material or flat sections 20 are attached to the upper surface of purlins 18 to form a complete roof.

For purposes of this disclosure it should be understood that the structures disclosed herein are assembled at the site and it is highly desirable that each step of the assembly procedure be as simple as possible. Basically, each of the roof components (i.e. columns, beams, purlins, and roof sections or solar panels) are provided as individual items from a factory/shop and assembled on site into the desired structure. By providing the items separately each item can be relatively easily handled by workmen conveying the items to the site and by workmen doing the assembling at the site. Briefly, in this example the assembly procedure includes fixing a lower end of each column in the ground or in a base that serves as the ground. One end of a cantilever beam is affixed to the upper end of each column by structure that is described in more detail in a United States patent entitled "Flat Roof Support Structure", bearing U.S. Pat. No. 8,646, 230, and incorporated herein by reference.

In this embodiment, for example only, with the cantilever beams, or beams supported at the ends, fixedly attached, purlins are attached to the upper surface of the beams in a direction perpendicular to the beam. For attachment purposes, purlins include bolt holes in the mounting surface (described in more detail below) so that the purlins can be directly attached to the beams.

Figure 2:
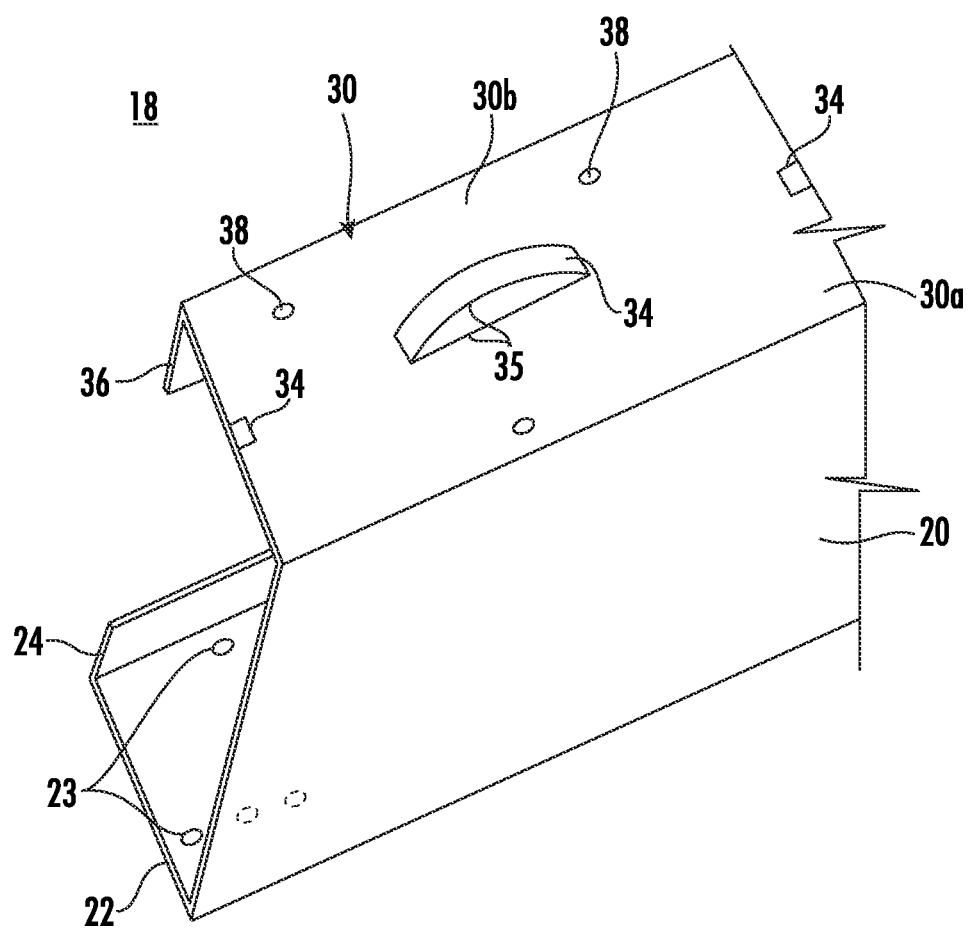
FIG. 2 is an isometric end view of the novel new purlin used in a flat roof structure of the type anticipated for the present invention with a preferred solar panel positioning element of the type anticipated for the present invention.

Referring specifically to FIG. 2, a generally sideways oriented U-shaped purlin 18 fabricated in one single integrated structure from a flat strip of sheet metal includes a major side or upright wall 20 with a lower or mounting wall 22 extending horizontally at a right angle to upright wall 20. An upright flange 24 is optionally formed at the outer edge of mounting wall 22 to add stiffness or additional lateral support to purlin 18. Upright wall 20, mounting wall 22, and flange 24 extend longitudinally the entire length of purlin 18. The lower surface of mounting wall 22 is designed to be mounted to and supported on roof beams, such as cantilever beams 14 in FIG. 1 and to this end bolt holes 23 are predrilled in mounting wall 22 at the factory to reduce assembly time. The attaching of purlins 18 to the roof beams is described in detail in one or both of the above cited copending patent applications and will not be elaborated upon further herein.

A horizontal cross piece 30 is formed integrally with and along the upper edge of upright wall 20 to complete the generally U-shaped configuration. Cross piece 30 provides a horizontal surface for supporting solar panels. Cross piece 30 extends horizontally outwardly from upright wall 20 to form an inverted L-shaped cross-section with upright wall 20. A vertically upwardly extending solar panel positioning element 34 is formed in cross piece 30 approximately midway between the edges and separates cross piece 30 into parallel horizontal support surfaces 30a and 30b. In this preferred embodiment solar panel positioning element 34 is an upwardly, accurately bent longitudinally extending portion of crosspiece 30. A plurality of positioning elements 34 are formed along the length of cross piece 30 in a longitudinally spaced apart relationship. Positioning elements 34 can be formed with a variety of methods, for example by cutting longitudinally extending spaced apart parallel slots 35 in cross piece 30 and bending the material between slots 35 upwardly into the illustrated arcuate configuration. Spaced apart elements 34 are positioned along the entire length of purlin 18 and serve to accurately position two solar panels, one from either side, on support surfaces 30*a* and 30*b*. Holes 38 are predrilled in support surfaces 30*a* and 30*b* for the attachment of solar panels thereto. A downwardly extending flange 36 is optionally formed at the outer edge of cross piece 30 to add stiffness or additional lateral support to purlin 18.

Figure 3:
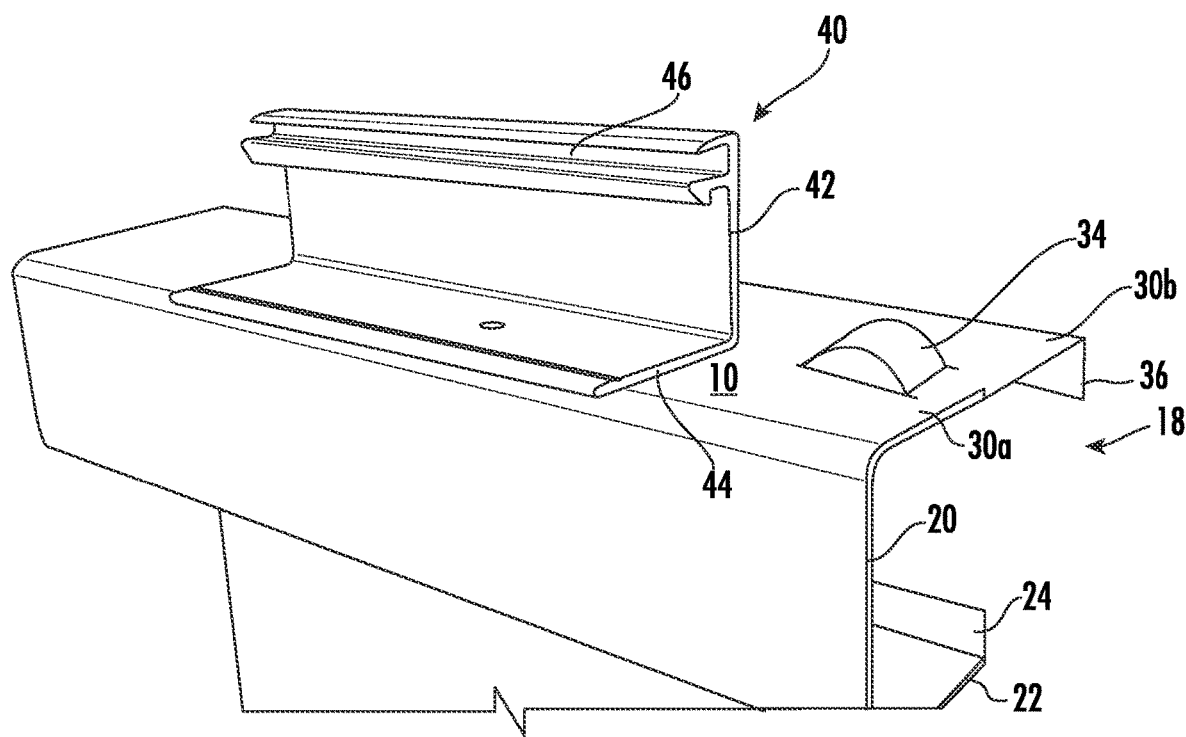
FIG. 3 is a perspective view of a solar panel section of the type used in the present invention in combination with the new and novel purlin of FIG. 2 in preparation for attachment, in accordance with the present invention.

To better understand a preferred size relationship between a solar panel and a purlin of the present invention, a section 10 of a solar panel is illustrated in FIG. 3 with the solar sensors removed to provide a better view of the frame construction. Solar panel section 10 is illustrated in position on support surface 30*a* of purlin 18 and butting against solar panel positioning elements 34. Solar panel section 10 illustrates that the solar panels discussed herein have a surrounding rectangular frame 40 with a generally L-shaped cross-section including a generally vertical outer wall 42 and an integrally attached horizontal lower mounting wall 44. Further, the upper end of vertical wall 42 of the L-shaped cross-section has an inwardly directed channel 46 formed thereon to surround and fixedly engage the outer edges of solar sensors and hold them rigidly in a horizontal orientation.

Figure 4:
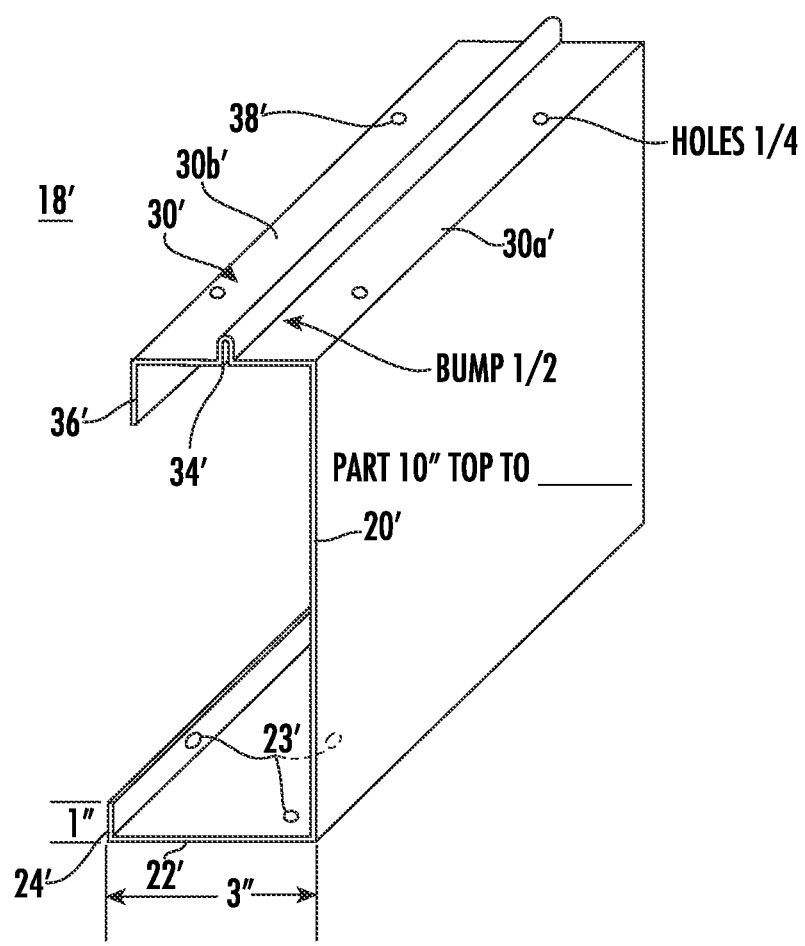
FIG. 4 is an isometric end view of the novel new purlin with another solar panel positioning element formed therein.

Referring specifically to FIG. 4, a generally sideways oriented U-shaped purlin 18' is illustrated with another solar panel positioning element 34' formed therein. In FIG. 4 similar components are designated with similar numbers and a prime (') is added to indicate a different embodiment. Purlin 18' is fabricated in one single integrated structure from a flat strip of sheet metal and includes a major side or upright wall 20' with a lower or mounting wall 22' extending horizontally at a right angle to upright wall 20'. An upright flange 24' is optionally formed at the outer edge of mounting wall 22' to add stiffness or additional lateral support to purlin 18'. Upright wall 20', mounting wall 22', and flange 24' extend longitudinally the entire length of purlin 18'. The lower surface of mounting wall 22' is designed to be mounted to and supported on roof beams, such as cantilever beams 14' in FIG. 1 and to this end bolt holes 23' are predrilled in mounting wall 22' at the factory to reduce assembly time.

A horizontal cross piece 30' is formed integrally with and along the upper edge of upright wall 20' to complete the generally U-shaped configuration. Cross piece 30' provides a horizontal surface for supporting solar panels. Cross piece 30' extends horizontally outwardly from upright wall 20' to form an inverted L-shaped cross-section with upright wall 20'. A vertically upwardly extending solar panel positioning element 34' is formed in cross piece 30' approximately midway between the edges and separates cross piece 30' into parallel horizontal support surfaces 30*a*' and 30*b*'. Element 34' extends the entire length of purlin 18' and serves to accurately position two solar panels, one from either side, on support surfaces 30*a*' and 30*b*'. Holes 38' are predrilled in support surfaces 30*a*' and 30*b*' for the attachment of solar panels thereto. A downwardly extending flange 36' is optionally formed at the outer edge of cross piece 30' to add stiffness or additional lateral support to purlin 18.

Figure 5:
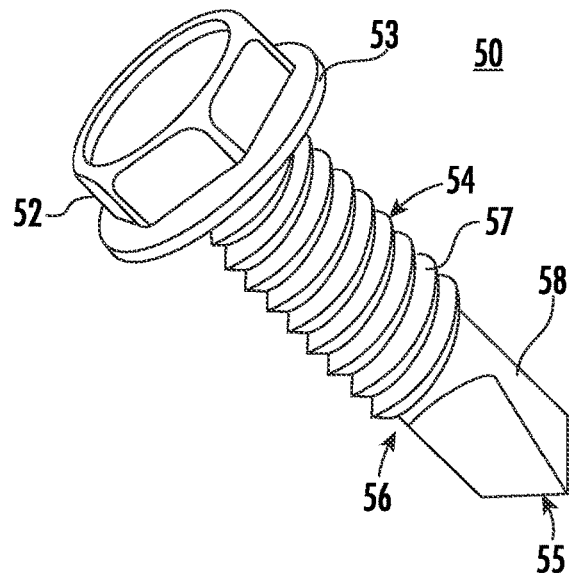
FIG. 5 is an isometric end view of the novel new bolt in accordance with the present invention.
Figure 6A:
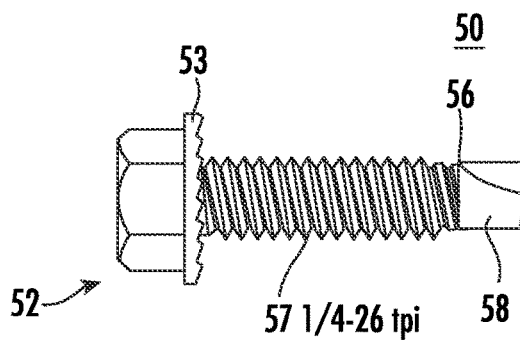
FIGS. 6A-6D are plan views of the new bolt illustrated in FIG. 5.
Figures 6B, 6C:
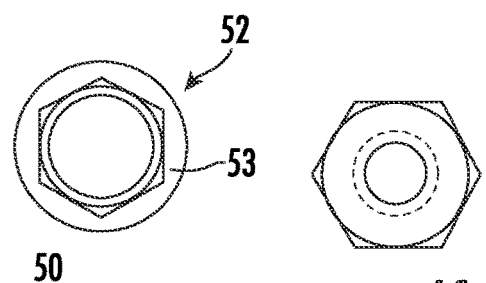
Figure 6D:
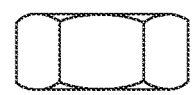

Turning to FIGS. 5 and 6, a solar panel attachment bolt 50 is illustrated. FIGS. 6A through 6D illustrate a side plan view, a left-hand end view, a right-hand end view, and a side plan view of the head of bolt 50, respectively. Attachment bolt 50 includes a hexagonal head 52 included as structure for attaching a driving tool to the head. In the example of the hexagonal head, which is preferred because it is sturdy and rugged, the head forms a hex for receiving a hexagonal driving tool but it will be understood that other structure might be incorporated, such as a square or triangular head, screwdriver slots, etc. In this preferred example, hexagonal head 52 has an outwardly extending washer-like portion 53 included to provide maximum surface contact. The inner surface of washer-like portion 53 has locking serrated teeth formed therein (see FIG. 5A) to enhance positive locking. It will of course be understood that other head forms can be selected depending upon the assembly equipment/tools used and the specific solar panels and purlins used.

Attachment bolt 50 includes an elongated body 54 integrally attached to head 52 and extending perpendicularly outwardly from head 52 to an end 55. A portion of body 54 extending from head 52 to a midpoint 56 is threaded with bolt threads 57 and a portion of body 54 extending from midpoint 56 to end 55 is formed into a drill bit 58. Drill bit 58 has an outer diameter smaller than the outer diameter of bolt threads 57. Thus, when attachment bolt 50 is used, for example, to attach solar panel section 10 to purlin 18 (see FIG. 3) a bolt driving tool is selected. Engaging the driving tool with bolt head 52, end 55 of attachment bolt 50 is inserted, from the bottom, in one of the holes 38 in cross piece 30 of purlin 18. The driving tool is activated and as attachment bolt 50 is rotated, drill bit 58 drills a hole in horizontal lower wall 44 of solar cell section 10 that is smaller in diameter than bolt threads 57. With continued rotation, bolt threads 57 engage the hole and pull washer-like portion 53 of hexagonal head 52 against the lower surface of cross piece 30 while simultaneously drawing horizontal lower wall 44 of solar cell section 10 against the upper surface of cross piece 30.

Figure 7:
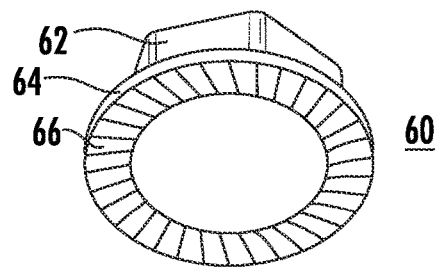
FIG. 7 is an isometric end view of a lock washer/nut employed with the bolt of FIG. 5.

Referring additionally to FIG. 7, a lock washer/nut 60 is illustrated. In this context, a lock washer/nut is basically a nut with a lock washer formed on one side as an integral part. In the present example, lock washer/nut 60 includes a hexagonal nut 62 and an integrally attached washer 64. Hexagonal nut 62 is internally threaded to mate with attachment bolt 50. Also, the inner surface of washer 64 has locking serrated teeth 66 formed therein to enhance positive locking. In use, lock washer/nut 60 is positioned on the upper surface of horizontal lower wall 44 of solar cell section 10 with the lock washer portion against the upper surface. When bolt threads 57 engage the hole in horizontal lower wall 44 bolt threads 57 also engage the internal threads in lock washer/nut 60 and pull washer portion 53 of hexagonal head 52 tightly against the lower surface of cross piece 30 and washer 64 tightly against the upper surface of horizontal lower wall 44 of solar cell section 10 to ensure a tight connection.

Thus, it will be understood that the new and improved purlin and attachment bolt can be conveniently used in assembly of various flat roof structures. The combined novel purlins and bolts can be used to easily position and mount solar panels or other flat roof sections with substantially reduced effort and error. Using the multiple component methods of fabrication, the purlins and bolts can be manufactured with substantially reduced machinery cost. Further, the new and improved bolts and purlins can be used to quickly and easily affix solar panels to roof beams at the site and do not require any on-site welding or any special tools.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A solar panel attachment assembly for use in affixing solar panels to flat roof structures comprising:
   an elongated purlin including a strip of sheet metal longitudinally bent into an elongated sideways oriented U-shaped channel with an upright wall, a mounting wall integrally attached to the lower edge of the upright wall, and a horizontal cross piece integrally attached to the upper edge of the upright wall, the purlin includes one or more vertically upwardly extending solar panel positioning elements integrally formed in the cross piece approximately midway between the edges and separating the cross piece into two parallel longitudinal horizontal support surfaces, the upright wall, the mounting wall, and the cross piece extending longitudinally the entire length of the purlin;
   a solar panel having a generally rectangular shape and including a rectangular metal frame with a generally L-shaped cross-section, a lower horizontal wall of the L-shaped cross-section forming a mounting surface and a vertical wall forming an outer surface of the solar panel, an inwardly directed channel formed on the upper edge of the vertical wall to surround and fixedly engage outer edges of solar sensors;
   a plurality of attachment bolts, each bolt including a head including structure for attaching a driving tool to the head and an elongated body integrally attached to the head and extending perpendicularly outwardly from the head to an end, a portion of the body extending from the head to a midpoint threaded with bolt threads and a portion of the body extending from the midpoint to the end formed into a drill bit, the drill bit having an outer diameter smaller than the outer diameter of the bolt threads;
   the plurality of attachment bolts being positioned to extend through the cross piece of the purlin and through a hole formed by the drill bit in the lower horizontal wall of the L-shaped cross-section; and
   a plurality of internally threaded lock washer/nuts positioned in engagement, one each, with the attachment bolts on the upper surface of lower horizontal wall of the solar panel to hold the solar panel in tight abutting engagement with the purlin.

2. The solar panel attachment assembly as claimed in claim 1 wherein the purlin includes a plurality of spaced apart holes defined through the horizontal cross piece.

3. The solar panel attachment assembly as claimed in claim 1 wherein the plurality of attachment bolts each include a hexagonal head with an outwardly extending washer-like portion positioned adjacent the threaded body portion.

4. The solar panel attachment assembly as claimed in claim 1 wherein the one or more vertically upwardly extending solar panel positioning elements include a plurality of upwardly, accurately bent longitudinally extending portions of the crosspiece and the plurality of the positioning elements are formed along the length of the cross piece in a longitudinally spaced apart relationship.

* * * * *